(12) United States Patent
Schafer, III et al.

(10) Patent No.: US 12,502,624 B1
(45) Date of Patent: Dec. 23, 2025

(54) METHODS AND SYSTEMS FOR STARTING UP AND OPERATING ONE OR MORE VAPOR-RECOMPRESSION UNITS

(71) Applicant: Energy Integration, Inc., Boulder, CO (US)

(72) Inventors: William Bryan Schafer, III, Boulder, CO (US); Zachary Arthur Schafer, Peyton, CO (US)

(73) Assignee: Energy Integration, Inc., Boulder, CO (US)

( * ) Notice: Subject to any disclaimer, the term of this patent is extended or adjusted under 35 U.S.C. 154(b) by 0 days.

(21) Appl. No.: 19/239,753

(22) Filed: Jun. 16, 2025

Related U.S. Application Data (60) Provisional application No. 63/661,940, filed on Jun. 20, 2024.

(51) Int. Cl.
*B01D 1/28* (2006.01)

(52) U.S. Cl.
CPC ......... *B01D 1/2896* (2013.01); *B01D 1/2881* (2013.01); *B01D 1/2893* (2013.01)

(58) Field of Classification Search
CPC ... B01D 1/2881; B01D 1/2893; B01D 1/2896
See application file for complete search history.

(56) References Cited

U.S. PATENT DOCUMENTS 3,409,067 A    11/1968   Dunklin et al.
6,365,005 B1 *   4/2002   Schleiffarth ............. B01D 3/42
                                                159/901

(Continued)

FOREIGN PATENT DOCUMENTS

CN    106422386 A    2/2017
CN    108773869 A    11/2018

OTHER PUBLICATIONS

Espacenet Machine Translation of CN 106422386 Obtained Oct. 6, 2025. (Year: 2025).*

(Continued)

*Primary Examiner* — Jonathan Miller
(74) *Attorney, Agent, or Firm* — O'Connor & Company; Ryan P. O'Connor (57) ABSTRACT

A method for starting up vapor-recompression units comprises: providing a vapor recompression sub-system comprising one or more vapor-recompression units, wherein the vapor recompression sub-system has a vapor inlet and a compressed-vapor outlet; providing a means of reducing vapor density through pressure reduction in vapor communication with the vapor recompression sub-system; reducing pressure within the vapor recompression sub-system to reach a sub-system pressure selected from 0.1 kPa to 1000 kPa; introducing a vapor mass flow to the vapor recompression sub-system at a restricted vapor mass flow rate; starting up the vapor recompression sub-system while maintaining the restricted vapor mass flow rate for a start-up time period; and then, following the start-up time period, introducing additional vapor mass flow to the vapor recompression sub-system to reach a full vapor mass flow rate. The restricted vapor mass flow rate is from 0.1% to 90% of the full vapor mass flow rate.

20 Claims, 1 Drawing Sheet

(56) References Cited

U.S. PATENT DOCUMENTS

| | | | | |
|---|---|---|---|---|
| 7,328,591 | B2* | 2/2008 | Holtzapple | F04F 5/466 |
| | | | | 62/333 |
| 7,708,865 | B2* | 5/2010 | Holtzapple | F04F 5/54 |
| | | | | 203/25 |
| 10,702,791 | B2* | 7/2020 | Winandy | C02F 1/041 |
| 11,097,203 | B1* | 8/2021 | Aguinaldo | B01D 3/148 |
| 11,291,927 | B2* | 4/2022 | Crawford | C10G 45/00 |
| 11,364,449 | B2* | 6/2022 | Crawford | B01D 1/2856 |
| 11,478,724 | B2* | 10/2022 | Crawford | C10G 61/00 |
| 11,649,174 | B2* | 5/2023 | Schleiffarth | B01D 5/0015 |
| | | | | 202/176 |
| 12,410,070 | B2* | 9/2025 | Schleiffarth | B01D 5/0015 |
| 2007/0204963 | A1 | 9/2007 | Praschak | |
| 2008/0083605 | A1* | 4/2008 | Holtzapple | B01D 1/28 |
| | | | | 239/398 |
| 2015/0360971 | A1* | 12/2015 | Schleiffarth | B01D 1/28 |
| 2016/0158666 | A1* | 6/2016 | Winandy | C02F 1/041 |
| | | | | 202/185.1 |
| 2019/0240592 | A1 | 8/2019 | Antar et al. | |
| 2022/0016542 | A1* | 1/2022 | Crawford | C07B 35/02 |
| 2023/0123549 | A1 | 4/2023 | Zhou et al. | |

OTHER PUBLICATIONS

Espacenet Machine Translation of CN 108773869 Obtained Oct. 6, 2025. (Year: 2025).*
PCT/US2025/033868 International Search Report and Written Opinion, Aug. 26, 2025.

* cited by examiner

METHODS AND SYSTEMS FOR STARTING UP AND OPERATING ONE OR MORE VAPOR-RECOMPRESSION UNITS

PRIORITY DATA

This patent application claims priority to U.S. Provisional Patent App. No. 63/661,940, filed on Jun. 20, 2024, which is hereby incorporated by reference.

FIELD

The present invention generally relates to methods and systems for starting up and operating vapor-recompression units in various industrial plants.

BACKGROUND

Mechanical vapor recompression (MVR) is an energy-recovery process which recycles waste heat to improve process efficiency. Heat from a condenser, which would otherwise be lost, can be recovered and used in a process. Typically, the pressure and temperature of a compressed vapor are increased in order to exchange heat with a lower-temperature and lower-pressure medium. The vapor is compressed using electricity to power the vapor compressor. The recycle of latent heat with mechanical vapor recompression is disclosed in U.S. Pat. Nos. 4,340,446, 4,422,903, 4,539,076, 4,645,569, 4,692,218, 4,746,610, 5,294,304, 7,257,945, 8,101,217, 8,101,808, 8,114,255, 8,128,787, 8,283,505, 8,304,588, 8,535,413, and 8,614,077, which are hereby incorporated by reference herein.

For example, distillation is generally the largest consumer of energy in a fermentation plant due to the dilute product solution produced by microorganisms. The large amount of water in the dilute product solution is separated from the desired product through distillation. Generally, the distillation system is heated by steam produced by combusting a fuel in a boiler. Vapors collected from the distillation system are cooled in a condenser where they release their latent heat of condensation. This energy is lost to the condenser's cooling water that, in turn, releases its heat to the atmosphere. By rerouting the vapors prior to their introduction into the condenser and increasing the pressure and temperature of the vapors through electricity-driven vapor compression, the vapors can be employed directly in processes requiring higher-pressure and higher-temperature vapors, such as molecular sieve dehydration processes, or forced to condense, allowing the latent heat of condensation to be captured and transferred to water used to generate steam.

The use of MVR networks in a variety of plants has been pioneered for the past decade by Energy Integration, Inc., based in Boulder, Colorado, USA ("EII"). EII provides patented technologies allowing the design and installation of integrated mechanical vapor recompression for biofuel and biochemical production, along with other energy-intensive industrial processes. EII's suite of patented technologies significantly reduces the energy requirements and carbon intensity of production, far exceeding the efficiency of competing waste-heat recovery technologies. EII's technologies integrate multiple processes, increasing energy capture and reducing system equipment costs. EII's patented designs include distillation, fractionation, dehydration, evaporation, cooking, liquefaction, drying, fermentation, combined heat and power, and carbon dioxide processing. EII's technologies enable a drastic reduction in steam generated by the boiler, and a reduced need for cooling tower capacity.

Conventionally, MVR blowers have been started using inlet guide vanes (IGVs) to direct vapor flow into the compressor rotor blades, reducing the work needed from the compressor during startup. Currently, MVR blowers can be started with variable-frequency drives (VFDs). VFDs are used in mechanical vapor recompression systems to control the speed of compressor motors, enabling synchronization of the start-up process. VFDs allow controlled acceleration of the compressor motor, avoiding fast current input that can damage equipment and cause instability during a standard start-up. VFDs also provide the primary means of controlling the mass vapor flow through changing the speed of the blower rotor once the blowers have been started. A VFD can be employed to sequentially start a string of blowers and control vapor mass flow rates.

However, the start-up of mechanical vapor recompression systems requires a great deal of electrical power, which is not mitigated with VFDs since the speed and torque of the compressor motor still needs to match the total mass of the vapor flow being processed during start-up. This electrical power causes high operating costs due to the large peak power demand requirement. In addition, VFDs can produce transients and harmonics that complicate power quality management. Finally, the smaller demand for large VFDs means they are often unavailable or require custom-design engineering and manufacturing.

There is thus a desire for improved methods for starting up mechanical vapor recompression systems for a wide variety of process plants.

SUMMARY

Some variations of the invention provide a method for starting up and operating one or more vapor-recompression units, the method comprising:
  (a) providing a vapor recompression sub-system comprising one or more vapor-recompression units that are in vapor communication with each other, wherein the vapor recompression sub-system has a vapor inlet and a compressed-vapor outlet;
  (b) providing a means of reducing vapor density through pressure reduction in vapor communication with the vapor recompression sub-system;
  (c) reducing pressure within the vapor recompression sub-system by operating the means of reducing vapor density through pressure reduction to reach a sub-system pressure selected from about 0.1 kPa to about 1000 kPa (absolute);
  (d) before, during, or after step (c), introducing a vapor mass flow to the vapor recompression sub-system at a restricted vapor mass flow rate;
  (e) starting up the vapor recompression sub-system while maintaining the restricted vapor mass flow rate for a start-up time period; and
  (f) following the start-up time period, introducing additional vapor mass flow to the vapor recompression sub-system to reach a full vapor mass flow rate,
  wherein the restricted vapor mass flow rate is selected from about 0.1% to about 90% of the full vapor mass flow rate.

In some embodiments, the vapor recompression sub-system comprises a single vapor-recompression unit. In other embodiments, the vapor recompression sub-system comprises more than one vapor-recompression unit.

In preferred embodiments, the vapor recompression sub-system utilizes mechanical vapor recompression.

In some embodiments, the means of reducing vapor density through pressure reduction utilizes a vacuum pump. The vacuum pump may be selected from the group consisting of piston pumps, rotary pumps, dry pumps, vapor ejector pumps, vapor diffusion pumps, turbomolecular pumps, sorption pumps cryopumps, centrifugal blowers, compressors, and combinations thereof, for example.

In some embodiments, the means of reducing vapor density through pressure reduction utilizes a vapor condenser. The vapor condenser may be selected from the group consisting of vacuum condensers, reboilers, evaporators, distillation columns, and combinations thereof.

In some embodiments, the means of reducing vapor density through pressure reduction utilizes direct vapor injection into a condensing process (e.g., a condensing cook solution).

In some embodiments, the vapor recompression sub-system comprises multiple vapor-recompression units, and a single means of reducing vapor density through pressure reduction is in vapor communication with a first vapor-recompression unit in the vapor recompression sub-system.

In some embodiments, the vapor recompression sub-system comprises multiple vapor-recompression units, and each vapor-recompression unit is configured with an individual means of reducing vapor density through pressure reduction.

In some embodiments, the vapor recompression sub-system comprises multiple vapor-recompression units, and vapor mass flow is restricted to each individual vapor-recompression unit independently.

In some embodiments, the vapor mass flow comprises steam. In other embodiments, the vapor mass flow comprises process vapors other than steam. In certain embodiments, the vapor mass flow comprises a mixture of steam and process vapors other than steam.

In some embodiments, the start-up time period is selected from about 30 seconds to about 12 hours. The start-up time period is not strictly limited; long start-up time periods may be employed without departing from the scope of the invention.

In some embodiments, the sub-system pressure is selected from about 0.5 kPa to about 200 kPa, such as about 1 kPa to about 100 kPa (absolute). In various embodiments, the sub-system pressure is about, at least about, or at most about (absolute pressures) 0.1 kPa, 0.2 kPa, 0.5 kPa, 1 kPa, 2 kPa, 3 kPa, 4 kPa, 5 kPa, 10 kPa, 15 kPa, 20 kPa, 25 kPa, 30 kPa, 35 kPa, 40 kPa, 45 kPa, 50 kPa, 60 kPa, 70 kPa, 80 kPa, 90 kPa, 95 kPa, or 100 kPa, including any intervening range.

In some embodiments, the restricted vapor mass flow rate is selected from about 0.5% to about 50% of the full vapor mass flow rate, such as from about 1% to about 20% of the full vapor mass flow rate.

Other variations of the technology provide a system configured for starting up and operating one or more vapor-recompression units, the system comprising:

(a) a vapor recompression sub-system comprising one or more vapor-recompression units that are capable of being in vapor communication with each other, wherein the vapor recompression sub-system has a vapor inlet and a compressed-vapor outlet;

(b) a means of reducing vapor density through pressure reduction that is capable of being in vapor communication with the vapor recompression sub-system; and (c) a control sub-system configured to carry out the following steps:

(i) reducing pressure within the vapor recompression sub-system by operating the means of reducing vapor density through pressure reduction to reach a sub-system pressure selected from about 0.1 kPa to about 1000 kPa (absolute);

(ii) before, during, or after step (i), introducing a vapor mass flow to the vapor recompression sub-system at a restricted vapor mass flow rate;

(iii) starting up the vapor recompression sub-system while maintaining the restricted vapor mass flow rate for a start-up time period;

(iv) following the start-up time period, introducing additional vapor mass flow to the vapor recompression sub-system to reach a full vapor mass flow rate; and (v) restricting flow to the inlet of the vapor recompression sub-system through the use of flow control valves including, but not limited to, integral guide vanes or proportional, integral, derivative flow control valves restricting flow to the vapor recompression sub-system or, alternatively, restricting flow to a competing pressure-reducing mechanism including, but not limited to, a condenser, an evaporator, a condensing heat exchanger, or a vacuum pump, wherein the restricted vapor mass flow rate is selected from about 0.1% to about 90% of the full vapor mass flow rate.

DETAILED DESCRIPTION OF EMBODIMENTS

Certain embodiments of the present invention will now be further described in more detail, in a manner that enables the claimed invention so that a person of ordinary skill in this art can make and use the present invention. All references herein to the "invention" shall be construed to refer to non-limiting embodiments disclosed in this patent application.

Unless otherwise indicated, all numbers expressing conditions, concentrations, yields, and so forth used in the specification and claims are to be understood as being modified in all instances by the term "about." Accordingly, unless indicated to the contrary, the numerical parameters set forth in the following specification and attached claims are approximations that may vary depending at least upon the specific analytical technique. Any numerical value inherently contains certain errors necessarily resulting from the standard deviation found in its respective testing measurements.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. If a definition set forth in this section is contrary to or otherwise inconsistent with a definition set forth in patents, published patent applications, and other publications that are incorporated by reference, the definition set forth in this specification prevails over the definition that is incorporated herein by reference.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

As will be described in more detail below, the present technology utilizes at least one vapor-recompression unit, which is preferably a mechanical vapor recompression (MVR). In this disclosure, another term for a vapor-recompression unit is a "blower". Another term for a network of multiple (two or more) vapor-recompression units is a "string of blowers". A string of blowers contains a plurality of blowers that are in vapor communication with each other. In a given plant, there may be one or more isolated vapor-recompression units that are in vapor isolation (not in vapor flow) with the string of blowers.

The present invention is predicated on starting up a string of blowers by reducing pressure to restrict or reduce the mass flow fed to the blower string, then gradually introducing increased mass flow—process vapors, steam, or both process vapors and steam—until full desired mass flow is achieved. This approach is believed to be a breakthrough, because reducing or restricting inlet mass flow on the string of blowers allows the blowers to run up to full speed with very low power consumption.

The disclosed technology is able to realize an important benefit. Namely, by operating the one or more vapor-recompression units under restricted mass flow, each unit may be run at full speed using very little power. The reduction in the amount of electrical power required for start-up leads to improved economics for the overall process as well as higher reliability, among other benefits.

According to the disclosed technology, a network of one or more vapor-recompression units may be started up under reduced pressure with restricted or reduced vapor mass flow. Mass flow to the vapor-recompression units is reduced at start-up by lowering pressure in the units and restricting inlet mass flow until the units are within the range of normal operational rotor speed with low power consumption, then additional mass flow is gradually introduced until a desired operational mass flow is achieved. Lowered pressure in the units is accomplished by restricting or reducing inlet flow while evacuating vapor from the units. An outlet pressure sufficiently low to avoid back pressure that might cause surging or back flow of the vapor-recompression units must be accomplished and maintained by condensing vapors or otherwise reducing outlet pressure following the last unit, using a vacuum pump, a condenser, or any other means of maintaining the system's balanced flow while progressing to normal operating conditions. Mass flow may be gradually introduced in the form of process vapors and/or steam fed at an increasing rate that allows progressive, balanced increase in the power consumed by the vapor-recompression units. A wide variety of process vapors may be introduced to the network of one or more vapor-recompression units. Full operational mass flow is realized at steady state. Operation at reduced mass flow conditions is accomplished through inlet restriction as previously described.

Figure 1:
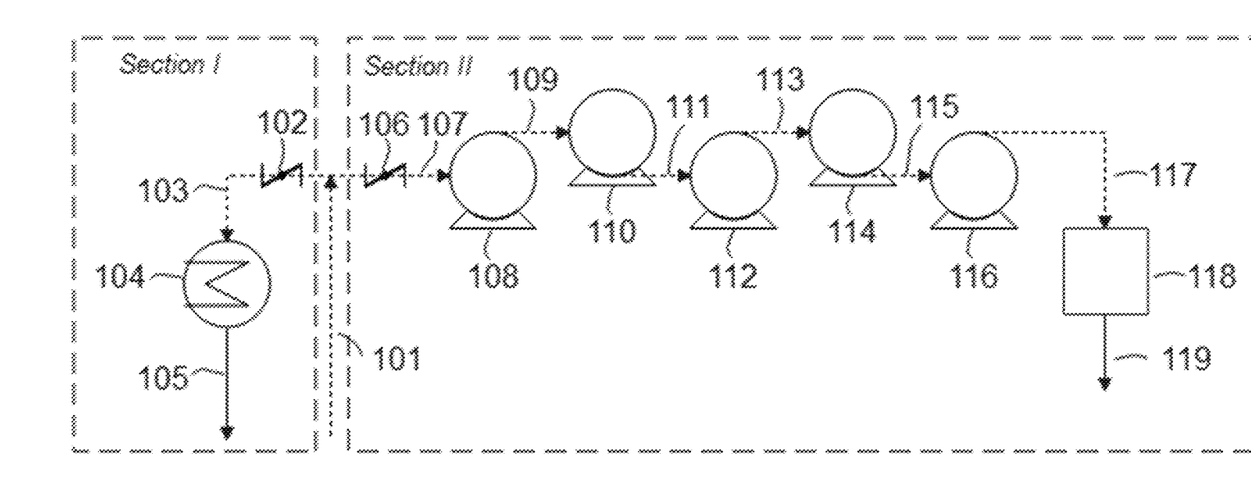
FIG. 1 depicts a simplified block-flow diagram of some variations of the invention for starting up a string of vapor-recompression units.

FIG. 1 depicts a simplified block-flow diagram of some variations of the invention. In FIG. 1, there is a condenser process path labeled "Section I" and a mechanical vapor recompression process path labeled "Section II". A vapor line 101 leads to both the condenser process path and the mechanical vapor recompression process path. The vapor line 101 contains selected vapors, which may be steam, process vapors (e.g., ethanol), or a mixture of steam and process vapors. The vapor line 101 is typically connected to another location from within the plant where vapors are generated or otherwise available.

In Section I of FIG. 1, the vapors pass from vapor line 101, to a standard condenser 104 via butterfly valve 102 and vapor line 103. The standard condenser 104 is cooled by a cooling system (not shown). The condensed vapors leaving condenser 104 pass through liquid line 105 to be utilized for any additional processing.

In Section II of FIG. 1, a mechanical vapor recompression blower string is depicted. In this particular embodiment, the blower string includes five mechanical compressors 108, 110, 112, 114, and 116. Selected vapors pass from vapor line 101, to mechanical compressor 108 via butterfly valve 106 and vapor line 107. Compressor 108 compresses the vapors that come from vapor line 107 and passes the vapors to mechanical compressor 110 via vapor line 109. Compressor 110 compresses the vapors that come from vapor line 109 and passes the vapors to mechanical compressor 112 via vapor line 111. Compressor 112 compresses the vapors that come from vapor line 111 and passes the vapors to mechanical compressor 114 via vapor line 113. Compressor 114 compresses the vapors that come from vapor line 113 and passes the vapors to mechanical compressor 116 via vapor line 115. Compressor 116 compresses the vapors that come from vapor line 115 and passes the vapors via vapor line 117 to vacuum system 118. The output vapors 119 are evacuated from the vacuum system 118. Optionally, during start-up, the output vapors 119 are condensed or compressed in a separate unit (not shown).

During start-up of the mechanical vapor recompression string, reduced mass flow can be realized within mechanical compressors 108, 110, 112, 114, and 116 as well as vapor lines 107, 109, 111, 113, 115, 117, and 119 by closing butterfly valve 106 and/or opening butterfly valve 102 and turning on vacuum system 118. Liquid or vapor from vacuum system 118 are moved away via line 119. The pressure in line 117 should be sufficiently low to avoid back pressure that might cause surging or back flow of mass into the mechanical compressors. After reduced mass flow is achieved, mechanical compressors 108, 110, 112, 114, and 116 can be started with lower power consumption than if the mechanical compressors and vapor lines were full of higher-density vapors with a greater mass at a higher pressure and vapor density.

Once the mechanical compressors have been started and have reached desired speeds, butterfly valve 102 can be closed and butterfly valve 106 can be opened. The rates of actuation for these valves (102/106) are preferably matched to prevent back flow of mass into vapor line 101. Also, the actuation rates for valves 102 and 106 should be gradual enough to allow for incremental increases in vapor mass flow into the blower string. Gradual increase of vapor mass flow into the mechanical recompression units allows mechanical compressors 108, 110, 112, 114, and 116 to ramp up without rapid increases in power consumption. After butterfly valve 102 is sufficiently closed and butterfly valve 106 is sufficiently opened, condenser 104 can be turned off or operated at a reduced rate.

During normal operation of the blower string, line 117 may be the compressed-vapor outlet of the blower string. Optionally, the compressed vapor in line 117 is still sent through the vacuum system 118, which for normal operation may be turned off (not reducing pressure), in which case line 119 becomes the compressed-vapor outlet. In any case, following the start-up procedure, the compressed-vapor outlet provides compressed vapor that can be stored for subsequent utilization or immediately utilized for any additional processing as desired.

Following start-up, Section II can be operated for any intended purpose, at steady state for an arbitrary length of time, until the blower string is shut down, such as for routine maintenance or when the plant is being shut down. The blower string may be installed at a biorefinery, an oil refinery, a natural gas refinery, a chemical plant, a pulp and paper plant, a food-processing plant, a textiles plant, a metal-processing plant, a pharmaceuticals plant, a seawater-desalination plant, a syngas-processing plant, a $CO_2$-processing plant, or a nuclear-power plant, for example.

In some variations, Section I of FIG. 1 is utilized to reduce pressure, instead of the vacuum system 118. In these embodiments, the vacuum system 118 may be omitted from FIG. 1. Section I is employed as a means of reducing vapor density through pressure reduction. For example, a high vapor mass flow rate through valve 102 can be used to reduce the vapor mass flow rate through valve 106 and vapor line 107, for a fixed incoming vapor mass flow rate in vapor line 101. The positions of the valves 102 and 106 can be used to reduce vapor density, via pressure reduction, to the blower string in Section II. When it is desired to reduce pressure in the blower string, the valve 106 may be open, partially closed, or completely closed. For example, the valve 106 may be completely open when valve 102 is also open. The valve 106 may be partially closed, depending on the desired vapor mass flow rate through line 107. The valve 106 may be completely closed to temporarily block off vapor flow to the blower string, which may already have some vapor present, or potentially no vapor yet present. During start-up, the valve 106 may then be partially or completely opened, either to complete the start-up procedure, or to operate at steady state.

In some variations, Section I of FIG. 1 can be replaced with another means of provided a controlled flow of vapors from a vapor line 101. For example, vapors may be provided from another vapor-processing unit that is in vapor communication with the vapor line 101. Vapors may be provided on demand (e.g., using a controlled valve) from a condenser, a distillation column, a reactor, a dryer, a vapor container, or an adjacent facility, for example.

Some variations of the invention provide a method for starting up and operating one or more vapor-recompression units, the method comprising:

(a) providing a vapor recompression sub-system comprising one or more vapor-recompression units that are in vapor communication with each other, wherein the vapor recompression sub-system has a vapor inlet and a compressed-vapor outlet;

(b) providing a means of reducing vapor density through pressure reduction in vapor communication with the vapor recompression sub-system;

(c) reducing pressure within the vapor recompression sub-system by operating the means of reducing vapor density through pressure reduction to reach a sub-system pressure selected from about 0.1 kPa to about 1000 kPa (absolute);

(d) before, during, or after step (c), introducing a vapor mass flow to the vapor recompression sub-system at a restricted vapor mass flow rate;

(e) starting up the vapor recompression sub-system while maintaining the restricted vapor mass flow rate for a start-up time period; and (f) following the start-up time period, introducing additional vapor mass flow to the vapor recompression sub-system to reach a full vapor mass flow rate, wherein the restricted vapor mass flow rate is selected from about 0.1% to about 90% of the full vapor mass flow rate.

In preferred embodiments, the vapor recompression sub-system utilizes mechanical vapor recompression. Note that an overall system (e.g., a refinery or biorefinery) may utilize thermal vapor recompression, which is not part of the disclosed start-up technology applied to mechanical vapor recompression.

In some embodiments, the vapor recompression sub-system comprises a single vapor-recompression unit. In other embodiments, the vapor recompression sub-system comprises more than one vapor-recompression unit.

The number of blowers, in a blower string, may be 1, 2, 3, 4, 5, 6, 7, 8, 9, 10, 11, 12, or more. In some embodiments, a single blower is utilized, in which case the single blower may be started up by pulling reducing pressure on the single blower, then introducing mass flow—process vapors, steam, or both process vapors and steam—gradually until full desired flow is achieved through the single blower.

The means of reducing outlet pressure while restricting or reducing mass flow to a blower, or across an entire string of blowers, may be a vacuum pump, a condenser, or another apparatus.

In some embodiments, the means of reducing vapor density through pressure reduction utilizes a vacuum pump. The vacuum pump may be selected from the group consisting of piston pumps, rotary pumps, dry pumps, vapor ejector pumps, vapor diffusion pumps, turbomolecular pumps, sorption pumps cryopumps, centrifugal blowers, compressors, and combinations thereof, for example. Vacuum pumps can be based on a number of different principles, such as (but not limited to) compression-expansion of the gas; drag by viscosity effects; drag by diffusion effects; molecular drag; or physical or chemical sorption.

In some embodiments, the means of reducing vapor density through pressure reduction utilizes a vapor condenser, such as (but not limited to) the condenser 104 shown in FIG. 1. The vapor condenser may be selected from the group consisting of vacuum condensers, reboilers, evaporators, distillation columns, and combinations thereof. In certain embodiments, the means of reducing vapor density through pressure reduction utilizes direct vapor injection into a condensing process (e.g., a condensing cook solution).

Some methods restrict flow to the vapor inlet through the use of flow control valves including, but not limited to, integral guide vanes or proportional, integral, derivative flow control valves restricting flow to the vapor recompression sub-system. Alternatively, or additionally, some methods restrict flow to a competing pressure-reducing mechanism including, but not limited to, a condenser, an evaporator, a condensing heat exchanger, or a vacuum pump.

In some embodiments in which the vapor recompression sub-system comprises multiple vapor-recompression units, a single means of reducing vapor density through pressure reduction is in vapor communication with a first vapor-recompression unit in the vapor recompression sub-system.

In some embodiments in which the vapor recompression sub-system comprises multiple vapor-recompression units, each vapor-recompression unit is configured with an individual means of reducing vapor density through pressure reduction. For example, in FIG. 1, separate vacuum systems may be connected to each blower (108/110/112/114/116), rather than one vacuum system 118 connected to blower 116.

The vapor mass flow rate fed to a given blower during start-up may vary widely, as long as there is sufficiently low vapor mass flow to limit power consumption. When there are multiple blowers in a string of blowers, typically each blower is operated at the same blower pressure during start-up. Restricting or reducing the vapor mass flow into the string of blowers reduces pressure in the entire string, since all blowers are in vapor communication with each other. The specific blower that is directly connected to the means of reducing vapor density through pressure reduction may be the first blower in the string, the last blower in the string (such as shown in FIG. 1), any other blower in the string. The means of reducing vapor density through pressure reduction may be spread across multiple blowers.

In certain embodiments, the last blower in the string is employed as the means for reducing vapor density through pressure reduction for the entire string, by configuring the last blower with a recycle loop and diversion valve, for example.

In some embodiments, the vapor recompression sub-system comprises multiple vapor-recompression units, and vapor mass flow is restricted to each individual vapor-recompression unit independently. In embodiments in which each blower is flow-restricted independently, each blower has a separate means of restricting mass flow. When there are two blowers, one or the other may be flow-restricted, or they both may be flow-restricted. Generally, for a string of n blowers (n≥3), the number of individual blowers that can be separately flow-restricted may be n, n–1, n–2, . . . , or 1. In the specific case of FIG. 1, the number of individual blowers that can be separately flow-restricted may be 5, 4, 3, 2, or 1.

In some embodiments, the vapor mass flow comprises steam. In other embodiments, the vapor mass flow comprises process vapors other than steam. In certain embodiments, the vapor mass flow comprises a mixture of steam and process vapors other than steam. Process vapors other than steam may vary widely, such as alcohols (e.g., methanol and/or ethanol), alkanes (e.g., n-hexane), olefins (e.g., cyclohexene), aromatics (e.g., toluene), ketones (e.g., acetone), aldehydes (e.g., pentanal), and non-carbon-containing species (e.g., ammonia).

In some embodiments, the start-up time period is selected from about 10 seconds to about 12 hours. In various embodiments, the start-up time period is about, at least about, or at most about 10 seconds, 20 seconds, 30 seconds, 45 seconds, 1 minute, 2 minutes, 3 minutes, 4 minutes, 5 minutes, 10 minutes, 15 minutes, 20 minutes, 30 minutes, 45 minutes, 1 hour, 2 hours, 3 hours, 4 hours, 5 hours, 6 hours, 7 hours, 8 hours, 9 hours, 10 hours, 11 hours, or 12 hours, including any intervening range. The start-up time period is not strictly limited; long start-up time periods may be employed without departing from the scope of the invention. The start-up time period could be 1 or more days, although that is not economically preferred.

When there are multiple blowers in a blower string, the time period of restricted or reduced vapor mass flow is usually the same, or about the same, for all blowers. The reason is that each blower is in vapor communication with each other. When there is relatively fast pressure equilibration across blowers during the start-up procedure, the effective restricted or reduced vapor mass flow time is also the same or similar. In other embodiments, different restricted or reduced vapor mass flow times are used for different blowers in a string; this can be accomplished, for example, by equipping one or more blowers with recycle loops, such that those blowers may reach a non-reduced vapor mass flow earlier in time than the other blowers.

In some embodiments, the sub-system pressure is selected from about 1 kPa to about 100 kPa (absolute). In various embodiments in which the sub-system pressure is less than atmospheric pressure, the sub-system pressure is about, at least about, or at most about (absolute pressures) 0.1 kPa, 0.2 kPa, 0.5 kPa, 1 kPa, 2 kPa, 3 kPa, 4 kPa, 5 kPa, 10 kPa, 15 kPa, 20 kPa, 25 kPa, 30 kPa, 35 kPa, 40 kPa, 45 kPa, 50 kPa, 60 kPa, 70 kPa, 80 kPa, 90 kPa, 95 kPa, or 100 kPa, including any intervening range.

The present invention is not limited to a blower being under vacuum at start-up, as long as there is restricted vapor mass flow. In various embodiments in which the sub-system pressure is greater than atmospheric pressure, the sub-system pressure is about, at least about, or at most about 80 kPa (about the atmospheric pressure in Denver, Colorado), 90 kPa, 100 kPa, 125 kPa, 150 kPa, 200 kPa, 250 kPa, 300 kPa, 400 kPa, 500 kPa, 600 kPa, 700 kPa, 800 kPa, 900 kPa, or 1000 kPa (absolute pressures), including any intervening range. As just one example, a first blower may operate at 200 kPa under normal operation. During start-up, the first blower may be drawn down to atmospheric pressure, which is usually about 101 kPa. Alternatively, the first blower could be drawn down to about 150 kPa which is above atmospheric pressure but still below normal operating pressure.

In some embodiments, the restricted vapor mass flow rate is selected from about 1% to about 50% of the full vapor mass flow rate. In various embodiments, the restricted vapor mass flow rate divided by the full vapor mass flow rate, expressed as a percentage, is about, at least about, or at most about 0.1%, 0.2%, 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, or 90%, including any intervening range.

Note that the above percentages are all based on mass flow. On a volume basis, the restricted vapor flow rate could actually be higher than the full vapor flow rate, since in normal operation the vapor is compressed to a higher density; under operating pressure, the volumetric flow rate is reduced for the same mass flow rate. Nevertheless, in some embodiments, the restricted vapor volumetric flow rate divided by the full vapor volumetric flow rate, expressed as a percentage, is less than 100%.

After the start-up time period, vapor mass flow is introduced in step (f) into the first blower in the string—or to the blower, when there is only one of them. The vapor mass flow may be a process vapor, such as an ethanol or methanol vapor; steam; or a combination of steam and one or more process vapors. This step is still during start-up, by definition, until steady state is achieved. The vapor mass flow may be introduced instantly, in a pulse; or gradually, over a time period to reach the full vapor mass flow rate. The time period in step (f) may vary, such as from 0 seconds (pulse) to about 1 hour. In some embodiments, the time period in step (f) is selected from about 1 minute to about 30 minutes. In various embodiments, the time period in step (f) is about, at least about, or at most about 0, 0.01, 0.05, 0.1, 0.5, 1, 2, 3, 4, 5, 6, 7, 8, 9, 10, 11, 12, 13, 14, 15, 20, 25, or 30 minutes, including any intervening range.

Typically, the composition of the full vapor mass flow in step (f) is the same as the composition of the restricted vapor mass flow during the start-up time period in step (e). A consistent vapor composition is not strictly necessary, however. In certain embodiments, one vapor composition, e.g. entering at line 101, is used to start up the blower string; then, the vapor composition is adjusted at line 101 to feed to the started-up blower string. Also, other vapor streams having the same composition as the restricted vapor mass flow may be added at different points in time or at different locations within the blower string. As just one example, a specific blower that is configured with a recycle loop and valving could have a second entry point, besides the vapor entry from the previous blower. That vapor entering at the second entry point may have a different pressure and/or temperature, even at the same composition, as the vapor from the previous blower.

In certain methods, a Variable Frequency Drive (VFD) is not utilized during any of steps (c), (d), (e), and (f). The blowers may be equipped with VFDs, but the VFDs remain unused during the method of starting up the blower string. Not using VFDs during steps (c), (d), (e), and (f) avoids significant electrical power quality issues resulting from system harmonic transients, and reduces the cost of the blower drive system.

It should be noted that specific unit operations may be omitted in some embodiments, and in these or other embodiments, other unit operations not explicitly shown may be included. Additionally, multiple pieces of equipment, either in series or in parallel, may be utilized for any unit operations, such as to adjust capacity or reliability. Also, solid, liquid, and gas streams produced or existing within the process may be independently recycled, passed to subsequent steps, or removed/purged from the process at any point.

Without limiting the scope of the present invention, the utilization of start-up vapor mass restriction in one or more blowers may be applied to any embodiment that is disclosed in any of the following patents, which are each incorporated by reference:

U.S. Pat. No. 9,925,476, issued on Mar. 27, 2018
U.S. Pat. No. 9,925,477, issued on Mar. 27, 2018
U.S. Pat. No. 10,787,407, issued on Sep. 29, 2020
U.S. Pat. No. 10,947,486, issued on Mar. 16, 2021
U.S. Pat. No. 11,034,638, issued on Jun. 15, 2021
U.S. Pat. No. 11,291,927, issued on Apr. 5, 2022
U.S. Pat. No. 11,364,449, issued on Jun. 21, 2022
U.S. Pat. No. 11,471,784, issued on Oct. 4, 2022
U.S. Pat. No. 11,458,413, issued on Oct. 18, 2022
U.S. Pat. No. 11,478,724, issued on Oct. 25, 2022

The method of the invention may be used in various processes to make a biofuel or biochemical. The biofuel or biochemical may be selected from the group consisting of methanol, ethanol, 1-propanol, 2-propanol, n-butanol, isobutanol, 2-butanol, tert-butanol, acetone, and combinations thereof. The biofuel or biochemical may also be selected from organic acids, such as lactic acid, higher alcohols (e.g., $C_{5+}$ alcohols), alkanes, etc. The invention may be applied to ABE fermentation, producing a mixture of acetone, n-butanol, and ethanol. Also, in some embodiments, the primary product is less volatile than water (at atmospheric pressure), rather than more volatile, as is the case with ethanol. An example of a product less volatile than water is isobutanol. A biofuel or biochemical may be produced by fermentation, but not necessarily; chemical catalysis can also be used.

In certain embodiments, a biofuel or biochemical is produced using fermentation of a sugar derived from a biomass feedstock. The biomass feedstock may be selected from agricultural crops and/or agricultural residues. In some embodiments, agricultural crops are selected from starch-containing feedstocks, such as corn, wheat, cassava, rice, potato, millet, sorghum, or combinations thereof. In some embodiments, agricultural crops are selected from sucrose-containing feedstocks, such as sugarcane, sugar beets, or combinations thereof.

Lignocellulosic biomass may also be used as a biomass feedstock. Lignocellulosic biomass is a preferred feedstock compared to oil or natural gas, due to reduced greenhouse-gas potential and reduced carbon intensity associated with the entire process. Lignocellulosic biomass includes, for example, plant and plant-derived material, vegetation, agricultural waste, forestry waste, wood waste, paper waste, animal-derived waste, poultry-derived waste, and municipal solid waste. In various embodiments of the invention, the biomass feedstock may include one or more materials selected from: timber harvesting residues, softwood chips, hardwood chips, tree branches, tree stumps, knots, leaves, bark, sawdust, off-spec paper pulp, cellulose, corn, corn stover, wheat straw, rice straw, sugarcane bagasse, switchgrass, miscanthus, animal manure, municipal garbage, municipal sewage, commercial waste, grape pumice, almond shells, pecan shells, coconut shells, coffee grounds, grass pellets, hay pellets, wood pellets, cardboard, paper, carbohydrates, plastic, and cloth.

As will be appreciated by a person of ordinary skill in the art, the principles of this disclosure may be applied to many industrial configurations beyond those explicitly disclosed or described. Various combinations are possible, and selected embodiments from some variations may be utilized or adapted to arrive at additional variations that do not necessarily include all features disclosed herein.

The present invention also provides a product produced by a process comprising a method comprising:
  (a) providing a vapor recompression sub-system comprising one or more vapor-recompression units that are in vapor communication with each other, wherein the vapor recompression sub-system has a vapor inlet and a compressed-vapor outlet;
  (b) providing a means of reducing vapor density through pressure reduction in vapor communication with the vapor recompression sub-system;
  (c) reducing pressure within the vapor recompression sub-system by operating the means of reducing vapor density through pressure reduction to reach a sub-system pressure selected from about 0.1 kPa to about 1000 kPa (absolute);
  (d) before, during, or after step (c), introducing a vapor mass flow to the vapor recompression sub-system at a restricted vapor mass flow rate;
  (e) starting up the vapor recompression sub-system while maintaining the restricted vapor mass flow rate for a start-up time period;
  (f) following the start-up time period, introducing additional vapor mass flow to the vapor recompression sub-system to reach a desired vapor mass flow rate, wherein the restricted vapor mass flow rate is selected from about 0.1% to about 90% of the full vapor mass flow rate; and (g) operating the vapor recompression sub-system to produce a product.

The product may be a bioproduct, such as ethanol; a chemical product, such as a mixture of benzene, toluene, and xylenes; or a food product, such as beverage alcohol or a citrus juice, for example. In some cases, a product is produced and an intermediate in the production is processed using the invention. For example, during production of alumina ($Al_2O_3$), caustic liquor vapor (NaOH) may be processed using the invention for recycling back into the alumina production process.

Other variations of the technology provide a system configured for starting up and operating one or more vapor-recompression units, the system comprising:

(a) a vapor recompression sub-system comprising one or more vapor-recompression units that are capable of being in vapor communication with each other, wherein the vapor recompression sub-system has a vapor inlet and a compressed-vapor outlet;

(b) a means of reducing vapor density through pressure reduction that is capable of being in vapor communication with the vapor recompression sub-system; and (c) a control sub-system configured to carry out the following steps:

(i) reducing pressure within the vapor recompression sub-system by operating the means of reducing vapor density through pressure reduction to reach a sub-system pressure selected from about 0.1 kPa to about 1000 kPa (absolute);

(ii) before, during, or after step (i), introducing a vapor mass flow to the vapor recompression sub-system at a restricted vapor mass flow rate;

(iii) starting up the vapor recompression sub-system while maintaining the restricted vapor mass flow rate for a start-up time period;

(iv) following the start-up time period, introducing additional vapor mass flow to the vapor recompression sub-system to reach a full vapor mass flow rate; and (v) restricting flow to the inlet of the vapor recompression sub-system through the use of flow control valves including, but not limited to, integral guide vanes or proportional, integral, derivative flow control valves restricting flow to the vapor recompression sub-system or, alternatively, restricting flow to a competing pressure-reducing mechanism including, but not limited to, a condenser, an evaporator, a condensing heat exchanger, or a vacuum pump, wherein the restricted vapor mass flow rate is selected from about 0.1% to about 90% of the full vapor mass flow rate.

The control sub-system may include well-known electronic controls that are connected to the system. For example, electronic controls may be used to control the position of valves (e.g., valve 106 in FIG. 1), the power input to an individual blower, and the total power input to the blower string. Electronic sensors may be used to sense process conditions, such as blower fan speed, pressure, temperature, and vapor mass flow rate. It is possible, but not preferred, for manual controls (e.g., a manually operated valve) and manual sensors (e.g., a pressure gauge read by an operator) to be used. The control sub-system may utilize well-known control logic principles, such as feedback control and feedforward control. Control logic may incorporate results from previous experiments or plant campaigns.

One or more computers are typically part of the control sub-system. The computers are configured with executable code to cause the control sub-system to carry out to desired steps at the desired times. The computers may be wired or wireless, and may be connected to a local network and/or the Internet. Some embodiments incorporate a control sub-system configured for automatically controlling a vapor-processing unit and a vapor recompression sub-system. The control sub-system may utilize artificial intelligence, such as machine-learning algorithms, deep-learning algorithms, neural networks, or a combination thereof.

In some embodiments, the vapor composition within the vapor recompression sub-system unit may be measured using a gas probe to extract a sample, which is then analyzed using a suitable technique, such as gas chromatography, GC; mass spectroscopy, MS; GC-MS; or Fourier-Transform Infrared Spectroscopy, FTIR. The vapor composition may be measured during start-up, for example, to ensure that the correct vapor is being fed to the blower string.

Safety considerations may be applied to the methods and systems. A unit may include protective devices (e.g., a safety release valve) that automatically activate when the temperature or pressure exceeds a maximum value, for example. Practical safety-related design may be built into the systems as well. Those skilled in the art will understand how to design safe units.

In the system, the one or more vapor-recompression units may be connected to a wide variety of process units. A process unit (equivalently, a "process stage") refers to an individual unit operation within an overall process or system, such as a refinery. Generally speaking, a process employs a plurality of individual process units. Unless otherwise indicated, the term "process" refers to an overall process for converting a feedstock into a final product. A process stage may be regarded as a step of an overall process. A process stage may also be regarded as a sub-system of an overall system. That is, depending on the context, a process stage may refer to a process step or to a physical sub-system; unless otherwise indicated, a process stage will refer to a process step.

A multistage process contains at least 2 process stages, such as 2, 3, 4, 5, 6, 7, 8, 9, 10, or more process stages. For example, refineries typically employ multiple fractionations for the refinement of multiple product streams. Exemplary multistage process methods and systems include, but are by no means limited to, biorefineries, petroleum refineries, petrochemical plants, natural gas refineries, shale oil refineries, coal-derived product refineries, and syngas-derived product plants.

Process stages as physical sub-systems may be vapor-processing units. Vapor-processing units may include, but are by no means limited to, distillation units, stripping units, flash units, single-effect evaporators, multiple-effect evaporators, molecular-sieve units, and chemical reactors.

When the vapor-processing unit is a chemical reactor (e.g., a catalytic reactor), such reactor may be used to carry out a chemical reaction selected from the group consisting of, for example, oxidation, reduction, hydrolysis, transesterification, condensation, oligomerization, polymerization, crystallization, isomerization, reforming, cracking, hydrodesulfurization, hydrotreating, alkylation, hydrogenation, dehydrogenation, dehydration (olefin formation), cyclization, coking, catalyst regeneration, and combinations thereof.

In some embodiments, at least one process stage is selected from distillation, evaporation, stripping, molecular-sieve treatment, chemical reaction, or a combination thereof. When a process involves chemical reaction, the chemical reaction may be selected from the group consisting of oxidation, reduction, hydrolysis, condensation, transesterification, oligomerization, polymerization, crystallization, isomerization, reforming, cracking, hydrodesulfurization, hydrotreating, alkylation, hydrogenation, dehydrogenation, dehydration (olefin formation), cyclicization, coking, catalyst regeneration, and combinations thereof, for example.

Fermentation plants typically generate carbon dioxide ($CO_2$) as a metabolic byproduct of fermentation, in addition to the primary bioproduct. In some cases, this $CO_2$ is captured and used, but often it is vented to the atmosphere as a waste product, or possibly sequestered in a geologic formation. Processes are known to convert carbon dioxide to a variety of chemical products, many of which require recovery and refinement of the final products through distillation. The process energy consumed in the distillation of bioproducts often constitutes the largest process energy demand as well as the largest source of carbon dioxide emissions resulting from combustion-supplied heat.

Historically, many processes generating carbon dioxide have emitted the $CO_2$ gas without further processing for conversion, reuse, or sequestration. Concerns regarding the impact of $CO_2$ emissions accelerating anthropogenic climate change have spurred efforts to capture and use or sequester those emissions. Currently, $CO_2$ is used in enhanced oil recovery, dry ice manufacturing, firefighting, manufacturing, refrigeration, food processing, and many other applications.

$CO_2$ may function as a chemical precursor, for its carbon and/or its oxygen content. Natural photosynthesis efficiently converts $CO_2$ into sugars in plant matter. Commercial synthesis of chemical products from $CO_2$ typically utilizes catalytic reactions at high temperatures to produce valuable products. Often, significant energy is required to meet the required conditions for processing $CO_2$ to chemicals. Using the disclosed technology, a process that converts $CO_2$ into a product is integrated into a plant vapor-compression system, optimizing energy efficiency and carbon intensity. The $CO_2$ may be converted to a product selected from the group consisting of methanol, ethanol, 1-propanol, 2-propanol, n-butanol, isobutanol, 2-butanol, tert-butanol, acetone, acetic acid, lactic acid, perylene, phenol thiazine, dihydrophenazine, 5,10-dihydrophenazine, and combinations thereof, for example.

Other possible products of $CO_2$ conversion include, but are not limited to, alkanes, olefins, aromatics, heterocyclics, and other complex organic compounds. Photochemical reactions may be utilized to provide the necessary energy to split the $CO_2$ molecule for conversion to products. Photochemical reactions may generate electrons for direct reduction, may generate heat that thermally converts $CO_2$, or may utilize photons from sunlight or from other sources (e.g., lasers) to convert $CO_2$. All of these reactions almost invariably lead to a watery product requiring distillation and possible dehydration to meet commercial product specifications.

Conventional refining processes raw materials that are composed of a crude mixture of fossil hydrocarbons (e.g., crude oil or coal) or natural gas. The raw material is passed through a refining process where the crude mixture is generally separated, fractionated, reacted, and/or purified to produce finished products with specific qualities. The refining process may utilize a reaction vessel for performing a chemical change, resulting in a mixture of products, followed by a separation process to purify the reaction products. Some reaction vessels utilize reactions to remove trace amounts of unwanted molecules (e.g., hydrogen sulfide). Refinery processes invariably produce a mixture requiring purification through further processing and separation.

Examples of refined products from fractionating include liquid fuels such as light-density gasoline, higher-density diesel fuel and jet fuel, specialized chemical feedstocks for plastics, and industrial solvents. Examples of gaseous fuels separated from petroleum range from methane to propane, co-producing high-density solid hydrocarbons such as asphalt. An example separation of molecules with nearly identical properties is separation of aromatic chemicals including a toluene/xylene fraction where the boiling points of each component vary over a small range, with xylene comprising three isomers (meta-xylene, ortho-xylene, and para-xylene).

Many regulations are pertinent to conventional refining. Examples of regulations impacting energy consumers and producers include California's Low Carbon Fuel Standard (LCFS). The LCFS models a fuel's lifecycle $CO_2$ emissions from production to consumption, thereby defining pathways for calculating each fuel's Carbon Intensity ("CI"). Each fuel's CI generates credits or requires the purchase of credits from other producers to meet California's CI targets. These credits are traded on an exchange that establishes their value and permits monetization by producers. Improvements in process energy efficiency are directly rewarded through the LCFS system, incentivizing energy-efficiency investments. This system, and similar systems under consideration by various governmental authorities globally, directly rewards producers for reducing their energy requirements and associated CI score, even when low energy prices provide little or no economic incentive to otherwise make such investments. Additionally, such incentives promote the use of energy with low CI scores in process designs-rather than fossil fuel combustion.

Integrating mechanical compression with multiple plant processes can minimize heat losses by providing advantages not available for typical cascaded heat integration. In cascaded heat integration, where energy can only be cascaded from higher to lower temperatures and pressures, the staged reduction in temperature and pressure eventually drops below the requirements for plant processes, at which point steam or process vapors are condensed, losing their latent heat. Vapor compression provides a means to raise these temperatures and pressures to a level that can be condensed and reintroduced, meeting process requirements, while minimizing energy lost to the environment. The complexity of balancing process energy needs across multiple processes has historically discouraged attempts at designing systems utilizing mechanical vapor compression in favor of simply cascading heat and discarding the heat of compression once vapors become "low-grade", i.e. too low for reuse. When vapor compression was used, process designers have historically applied vapor compression to isolated processes with the advantage of lowering the energy to that isolated process, but not realizing the greater benefit available through the integration of multiple processes.

The throughput, or process capacity, may vary widely from small laboratory-scale units to full commercial-scale plants, including any pilot, demonstration, or semi-commercial scale. In various embodiments, the process capacity is at least about 1 kg/day, 10 kg/day, 100 kg/day, 1 ton/day (all tons are metric tons), 10 tons/day, 100 tons/day, 500 tons/day, 1000 tons/day, 2000 tons/day, 3000 tons/day, 4000 tons/day, or higher.

The method for starting up a blower string is typically utilized at an industrial plant. The plant may be a retrofit to an existing plant. In other embodiments, the plant is a greenfield plant.

As will be appreciated by a person skilled in the art, the principles of this disclosure may be applied to many plant configurations beyond those explicitly disclosed or described in the drawings hereto. Various combinations are possible. Selected embodiments from some variations may be utilized or adapted to arrive at additional variations that do not necessarily include all features disclosed herein.

All publications, patents, and patent applications cited in this specification are incorporated herein by reference in their entirety as if each publication, patent, or patent application was specifically and individually put forth herein.

In this detailed description, reference has been made to multiple embodiments of the invention and non-limiting examples and drawings relating to how the invention can be understood and practiced. Other embodiments that do not provide all of the features and advantages set forth herein may be utilized, without departing from the spirit and scope of the present invention.

This invention incorporates routine experimentation and optimization of the methods and systems described herein. Such modifications and variations are considered to be within the scope of the invention defined by the claims.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent that there are variations of the invention, which are within the spirit of the disclosure or equivalent to the inventions found in the appended claims, it is the intent that this patent will cover those variations as well. The present invention shall only be limited by what is claimed.

What is claimed is:

1. A method for starting up and operating one or more vapor-recompression units, said method comprising:
   (a) providing a vapor recompression sub-system comprising one or more vapor-recompression units that are in vapor communication with each other, wherein said vapor recompression sub-system has a vapor inlet for a vapor and a compressed-vapor outlet for a compressed form of said vapor;
   (b) providing a means of reducing vapor density of said vapor through pressure reduction, wherein said means of reducing vapor density through pressure reduction is in vapor communication with said vapor recompression sub-system;
   (c) reducing pressure of said vapor within said vapor recompression sub-system by operating said means of reducing vapor density through pressure reduction to reach a sub-system pressure selected from about 0.1 kPa to about 1000 kPa (absolute);
   (d) before, during, or after step (c), introducing a vapor mass flow to said vapor recompression sub-system at a restricted vapor mass flow rate, wherein said vapor mass flow is a flow of said vapor;
   (e) starting up said vapor recompression sub-system while maintaining said restricted vapor mass flow rate for a start-up time period; and
   (f) following said start-up time period, introducing additional vapor mass flow to said vapor recompression sub-system to reach a full vapor mass flow rate, wherein said additional vapor mass flow is a flow of said vapor,
   wherein said restricted vapor mass flow rate is selected from about 0.1% to about 90% of said full vapor mass flow rate.

2. The method of claim 1, wherein said vapor recompression sub-system comprises a single vapor-recompression unit.

3. The method of claim 1, wherein said vapor recompression sub-system comprises more than one vapor-recompression unit.

4. The method of claim 1, wherein said vapor recompression sub-system utilizes mechanical vapor recompression.

5. The method of claim 1, wherein said vapor recompression sub-system utilizes thermal vapor recompression.

6. The method of claim 1, wherein said means of reducing vapor density through pressure reduction utilizes a vacuum pump.

7. The method of claim 6, wherein said vacuum pump is selected from the group consisting of piston pumps, rotary pumps, dry pumps, vapor ejector pumps, vapor diffusion pumps, turbomolecular pumps, sorption pumps cryopumps, centrifugal blowers, compressors, and combinations thereof.

8. The method of claim 1, wherein said means of reducing vapor density through pressure reduction utilizes a vapor condenser.

9. The method of claim 8, wherein said vapor condenser is selected from the group consisting of vacuum condensers, reboilers, evaporators, distillation columns, and combinations thereof.

10. The method of claim 1, wherein said means of reducing vapor density through pressure reduction utilizes direct vapor injection into a condensing process.

11. The method of claim 1, wherein said vapor recompression sub-system comprises multiple vapor-recompression units, and wherein a single means of reducing vapor density through pressure reduction is in vapor communication with a first vapor-recompression unit in said vapor recompression sub-system.

12. The method of claim 1, wherein said vapor recompression sub-system comprises multiple vapor-recompression units, and wherein each vapor-recompression unit is configured with an individual means of reducing vapor density through pressure reduction.

13. The method of claim 1, wherein said vapor recompression sub-system comprises multiple vapor-recompression units, and wherein vapor mass flow is restricted to each individual vapor-recompression unit independently.

14. The method of claim 1, wherein said vapor comprises steam.

15. The method of claim 1, wherein said vapor comprises process vapors other than steam.

16. The method of claim 1, wherein said vapor comprises a mixture of steam and process vapors other than steam.

17. The method of claim 1, wherein said start-up time period is selected from about 30 seconds to about 12 hours.

18. The method of claim 1, wherein said sub-system pressure is selected from about 0.5 kPa to about 200 kPa (absolute).

19. The method of claim 1, wherein said sub-system pressure is selected from about 1 kPa to about 100 kPa (absolute).

20. The method of claim 1, wherein said restricted vapor mass flow rate is selected from about 1% to about 50% of said full vapor mass flow rate.

* * * * *